July 13, 1954
W. S. BAILEY
2,683,541
LOG LOADER FOR VEHICLES
Filed Nov. 9, 1953
4 Sheets-Sheet 1
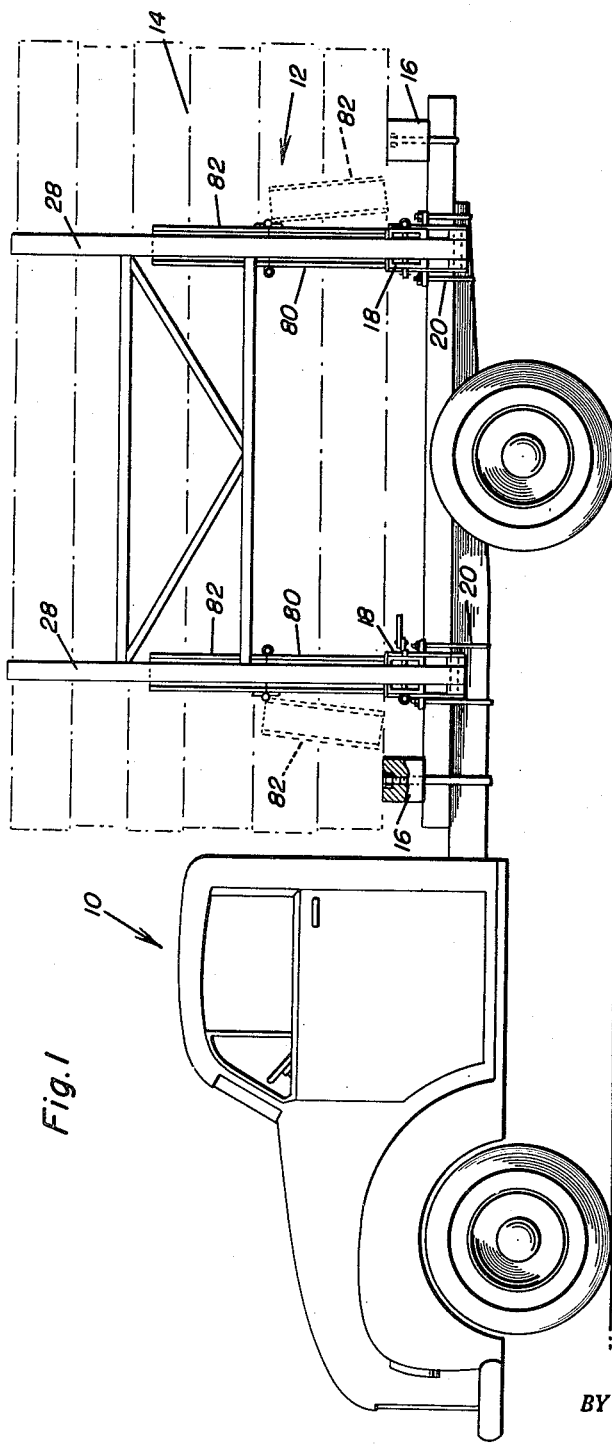
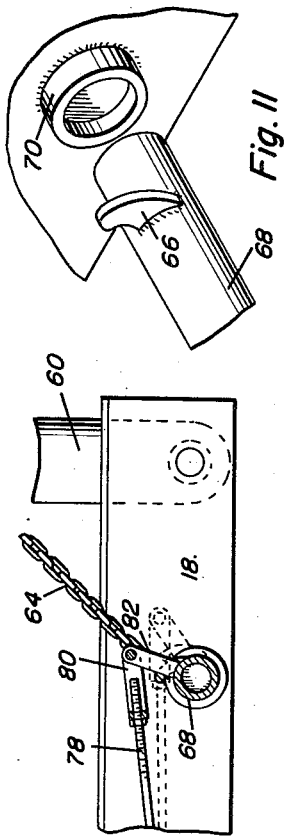
Waldo S. Bailey
INVENTOR.
BY *Clarence A. O'Brien
and Harvey B. Jacobson*
Attorneys

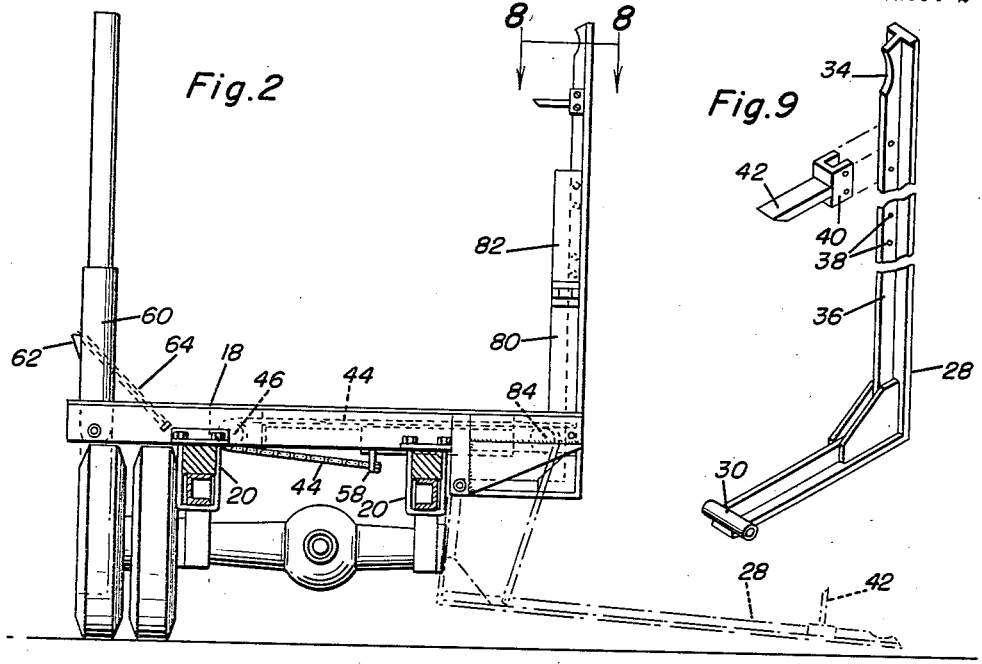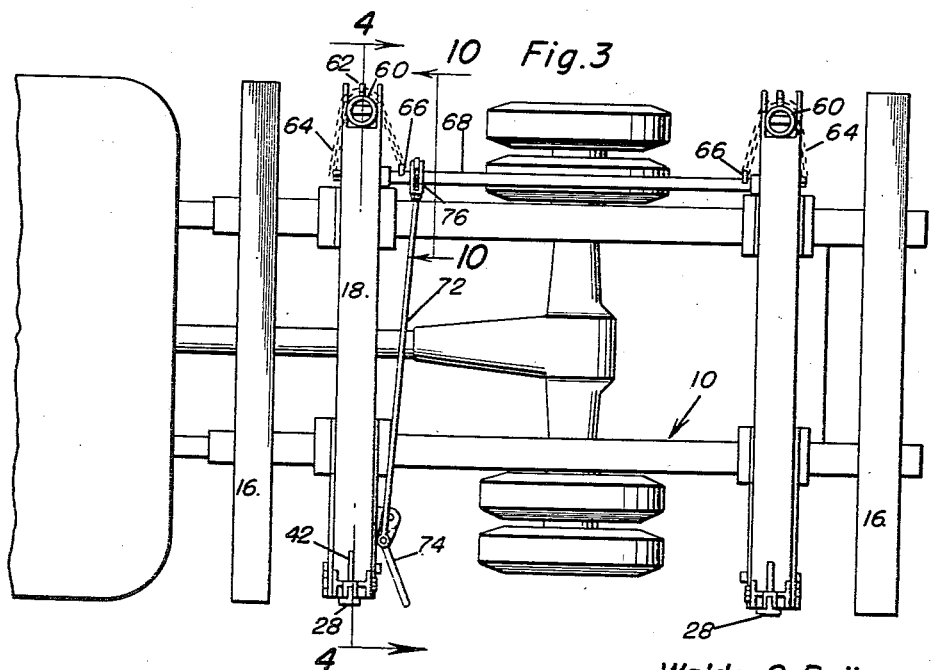

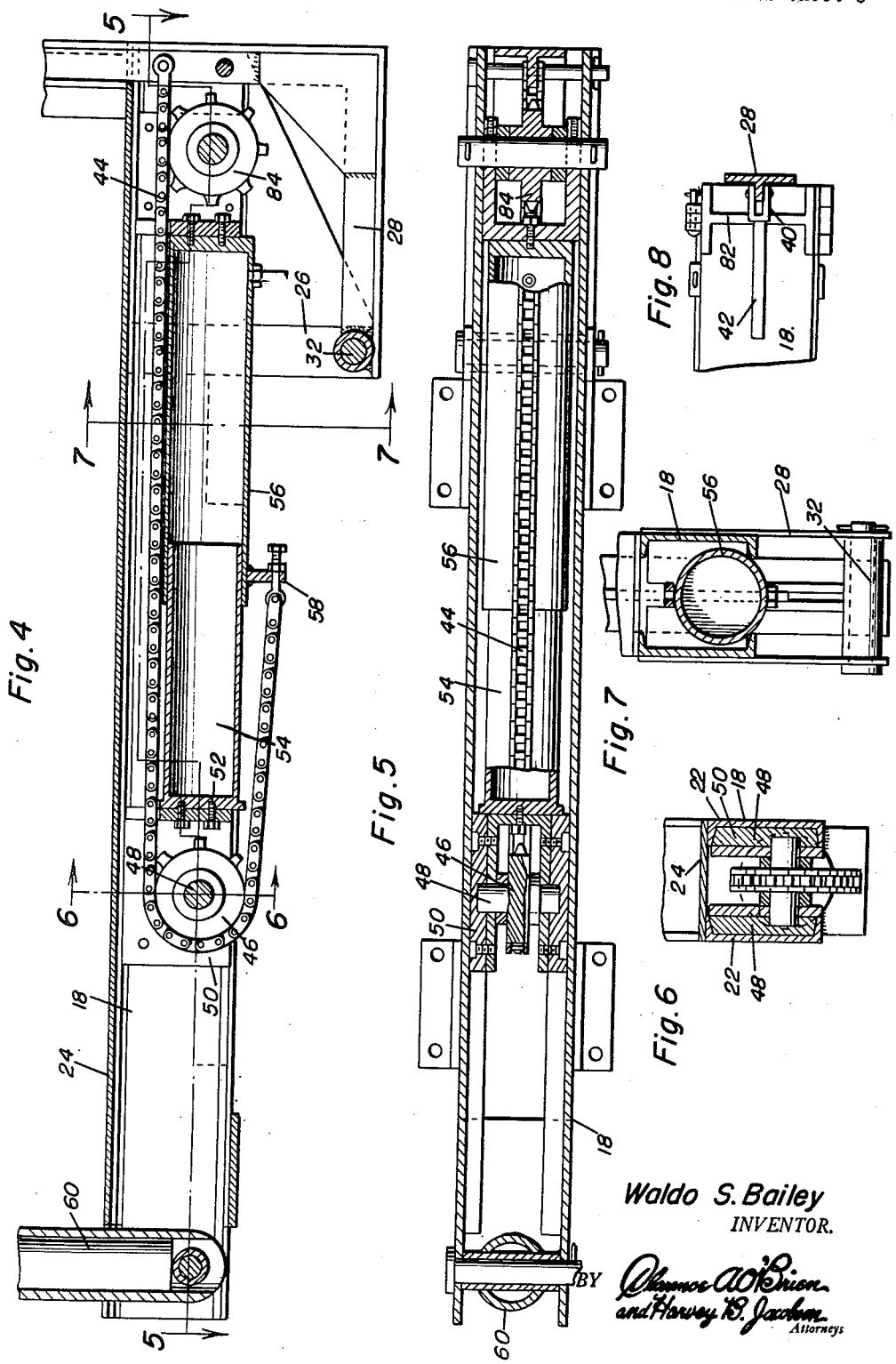

July 13, 1954 W. S. BAILEY 2,683,541
LOG LOADER FOR VEHICLES
Filed Nov. 9, 1953 4 Sheets-Sheet 4
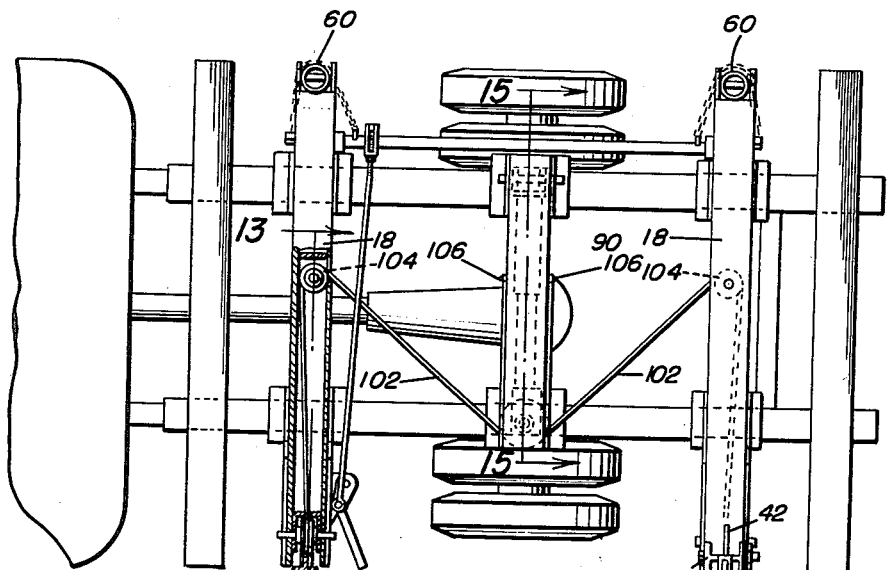
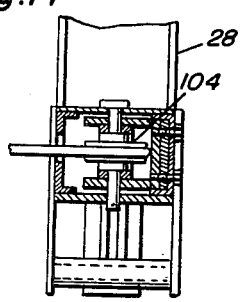
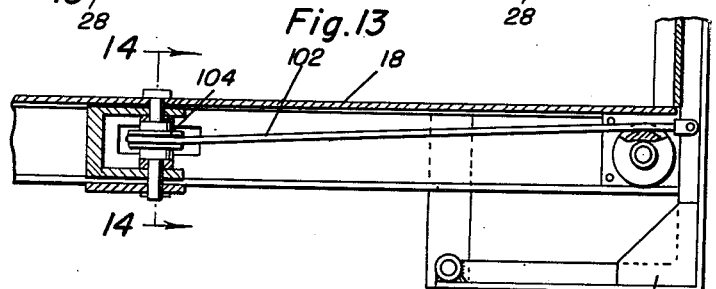
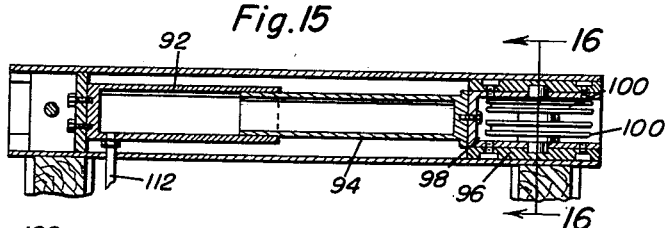
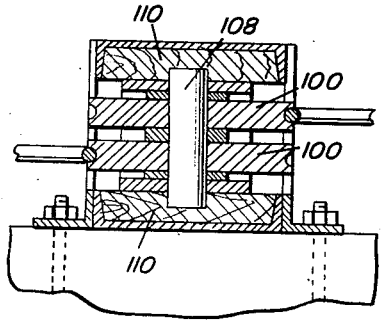
Waldo S. Bailey
INVENTOR.

Patented July 13, 1954

2,683,541

UNITED STATES PATENT OFFICE 2,683,541

LOG LOADER FOR VEHICLES

Waldo S. Bailey, New Berlin, N. Y., assignor of one-third to Kenneth Maxon and one-third to Irving W. Montgomery, both of New Berlin, N. Y.

Application November 9, 1953, Serial No. 390,834

2 Claims. (Cl. 214—77)

This invention relates to the class of land vehicles and more particularly to an improved log loading apparatus.

The primary object of this invention resides in the provision of an apparatus for facilitating the loading of logs and the like on a truck.

The construction of this invention features means for raising logs from the surface of ground so as to enable the logs to be placed on a truck. Such means includes pivotally mounted arms having stops adjustably secured thereto. The arms are reinforced by spaced support members attached to cross beams mounted detachably on the chassis of a truck. The support members have hingedly secured upper sections so that when the log stop is in a lowered position the hinged upper portions may be folded out of the way thereby enabling the logs to be loaded without having to raise them the full height of the pivoted arms when the arms are in the upright position.

Another feature of the invention resides in the provision of means for mounting standards at the other ends of the beams from the arms so that they may be readily and quickly released when it is desired to discharge the load of logs on the truck.

Still further objects and features of this invention reside in the provision of a log loader that may be readily attached to the chassis of a truck without requiring any further construction thereon, which is strong and durable, comparatively simple in the arrangement of parts thereof, and which is inexpensive to produce thereby permitting wide distribution in the logging field.

These, together with the various ancillary objects and features of the invention which will become apparent as the following description proceeds, are attained by this log loader, preferred embodiments of which have been illustrated in the accompanying drawings, by way of example only, wherein:

Figure 1 is a side elevational view of one embodiment of the log rolling apparatus as installed on the chassis of a truck;

Figure 2 is a vertical sectional view of the apparatus installed on the truck showing in dotted lines the load position of the log loading arms;

Figure 3 is a plan view of the log loading apparatus;

Figure 4 is an enlarged vertical sectional view as taken along the plane of line 4—4 in Figure 3;

Figure 5 is a horizontal sectional view as taken along the plane of line 5—5 in Figure 4;

Figure 6 is a sectional detail view as taken along the plane of line 6—6 of Figure 4;

Figure 7 is a vertical sectional view as taken along the plane of line 7—7 in Figure 4;

Figure 8 is an enlarged horizontal sectional view as taken along the plane of line 8—8 in Figure 2 illustrating the construction of the arms and the vertical support members used to retain the loaded logs in position;

Figure 9 is an exploded perspective view illustrating the construction of one of the log loading arms;

Figure 10 is an enlarged vertical sectional view as taken along the plane of line 10—10 in Figure 3 illustrating the construction of the means utilized for releasing the stakes;

Figure 11 is an exploded partial perspective view illustrating the manner in which the operating shaft is journalled in the beams and further illustrating the hook which is attached to the operating shaft;

Figure 12 is a plan view of a modified form of the invention with parts thereof being broken away for greater detail;

Figure 13 is an enlarged sectional detailed view as taken along the plane of line 13—13 in Figure 12;

Figure 14 is an enlarged vertical sectional view as taken along the plane of line 14—14 in Figure 13;

Figure 15 is a vertical sectional view as taken along the plane of line 15—15 in Figure 12 illustrating the means utilized for raising and lowering the arms; and Figure 16 is an enlarged vertical sectional view as taken along the plane of line 16—16 in Figure 15.

With continuing reference to the accompanying drawings wherein like reference numerals designate similar parts throughout the various views, and with particular attention initially to Figures 1 through 11, it will be noted that herein there is provided a truck 10 on which the log loading apparatus 12 is adapted to be secured. This log loading apparatus is adapted to raise logs 14 or the like onto the truck 10 in a convenient and safe manner.

The log loading apparatus includes a pair of spaced transverse members 16 which are secured to the bed of the truck in any convenient manner and are adapted to support part of the load 14. Another pair of beams 18 are secured to the truck by means of U-shaped clamps as at 20 which engage the longitudinal frame members of the truck 10.

Each of the beams 18 is formed from spaced channel-shaped members 22 which may have upper plates 24 attached thereto and extending therebetween. Downwardly extending mounting elements 26 are attached to the beams 18 and form a part thereof. These mounting elements 26 provide means for pivotally mounting a substantially L-shaped lifting arm 28 on each of the beam 18. The L-shaped mounting arms 28 can be best seen from an inspection of Figure 9 and include cylindrical mounting members 30 at the lower extremity thereof through which pins 32 extend which are secured to the mounting elements 26. The L-shaped members 28 further include a circular recess 34 therein for providing increased support for the logs when they are lifted at the ends of the arms 28. Additionally, since the arms 28 are substantially T-shaped in cross section, the centrally disposed flange 36 has a plurality of apertures 38 therein for reception of a fastener which extends through a channel-shaped attaching portion 40 of stop members 42 which are adapted to be adjustably secured to the arms 28. Each of the arms 28 has attached thereto one end of a chain 44 which is entrained about a sprocket wheel 46 rotatably mounted by means of a shaft 48 extending between preferably wooden runners as at 48 of a slide block slidably disposed in the beam 18. The slide block is generally indicated by reference numeral 50 and is attached by means of fasteners 52 to one end of a piston rod 54 which is received within a cylinder 56 secured to the beam 18. The cylinder 56 is connected to a suitable hydraulic system for providing means for actuating the piston 54. The other end of the chain 14 is secured to a bracket 58 depending from the piston 56 and hence carried by the beam 18. Then, upon actuation of the piston 56 the lifting arm 28 associated therewith can be raised to the position indicated in solid lines in Figure 2. However, upon release of hydraulic pressure in the cylinder 56 the lifting arm can be lowered by means of gravity to the position as shown in the dotted lines in Figure 2. Obviously, the lifting arm 28 can be controlled to any intermediate portion.

Pivotally secured to the beams 18 at the other ends thereof are standards 60 which have shoulders 62 welded or otherwise attached thereto. Chains 64 which are secured at one end to the beams 18 are engaged over the shoulders 62 and have the other ends thereof detachably engaged on hooks 66 mounted on an operating shaft 68 journalled in bearing members 70 attached to the beams 18. The operating shaft 68 extends between the beams 18. A linkage 72 operated by a crank mechanism 74 attached to the beam 18 is attached as at 76 to the operating shaft 68 for controlling rotation thereof and for lockingly holding the shaft 68 against rotation. However, when the crank mechanism 74 is released, the shaft 68 will be rotated so as to free the chain 64 from the hook 66 mounted on the shaft 68. The rod 72 is preferably threaded as at 78 and is engaged in a rotatably mounted member 80 attached to a crank arm 82 which forms the major portion of the attaching means 76 for connecting the rod 72 to the operating shaft 68.

The operation of this form of the invention is quite simple. With the standards 60 in a vertical position, the hydraulic pressure on the cylinder 56 can be released thereby permitting gravity to lower the lifting arms. After the stop members 42 have been adjusted to the lower position a log can be rolled on the spaced arms 28 and the hydraulic cylinder then actuated to raise the arms so as to load the truck 10. In order to retain the logs which are loaded on the truck in position there are provided a pair of vertical support members 80 which have hinged upper sections 82. When loading the first logs the hinged upper sections can be folded to the position as is shown in Figure 1 in dotted lines. However, as the load becomes successively higher on the truck, the upper section 82 may be raised to the vertical position and locked in position by any suitable means. Then, the stop member 42 is raised to an upper position using suitable fasteners which extend through any of the sets of apertures 38 in the arms 28. It is to be noted that additional sprockets 84 are mounted in the beams 18 over which the chains 44 pass when the arms 28 are being raised or lowered.

Referring now to the embodiment of the invention as shown in Figure 12, it will be noted that the beams 18 in this form of the invention are not provided with cylinders but that an additional cross member 90 is utilized. Within this cross member 90 there is provided a cylinder 92 for actuating a piston 94 having a slide block 96 attached thereto, the slide block 96 having a recess as at 98 in which pairs of pulleys 100 are mounted. Cables 102 are entrained about the pulleys 100 and about pulleys 104 mounted in the beams 18. The ends of the cable 102 are then attached to the arms 28 for raising and lowering the arms. The other ends of the cables 102 are attached to the central beam as at 106. It is to be noted that the pulleys 100 are vertically spaced and are journalled on a suitable shaft 108 which extends between the preferably wooden slides 110 of the slide block 96.

The operation of this form of the invention is identical to that of the first embodiment disclosed with the exception of the fact that the single hydraulic cylinder 92 which is connected to a hydraulic operating mechanism by suitable conduits 112 controls the operation of both of the lift arms 28.

Since from the foregoing the construction and advantages of this log loader are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A log loading apparatus for use in combination with a truck comprising a pair of spaced load supporting beams extending transversely across and detachably clampingly secured to said truck, a pair of substantially L-shaped lifting arms pivotally attached to ends of said beams, means for raising and lowering said arms, a pair of standards pivotally attached to said beams, an operating shaft journalled in said beams, chain means engaged by said operating shaft lockingly supporting said standards in an upright position, and means for actuating said shaft carried by one of said beams, said beams having vertical support members of I-shape attached thereto provided with hinged upper sections, said arms being of substantially T-shape in cross section having central flange portions adapted to be received within said support members, and log stop members adjustably secured to said arms, said means for raising and lowering said arms comprising blocks slidably positioned in said beams, an hydraulic cylinder supported by said truck between said beams, a piston slidably received in said cylinder extending outward of said cylinder, a pulley mounted on said piston and a cable terminally secured to said arms and engaged by said pulley to raise or lower said arms upon movement of said piston.

2. A log loading apparatus for use in combination with a truck comprising a pair of spaced load supporting beams extending transversely across and detachably clampingly secured to said truck, a pair of substantially L-shaped lifting arms pivotally attached to ends of said beams, means for raising and lowering said arms, a pair of standards pivotally attached to said beams, an operating shaft journalled in said beams, chain means engaged by said operating shaft lockingly supporting said standards in an upright position, and means for actuating said shaft carried by one of said beams, said operating shaft having hooks attached thereto, said standards having shoulders thereon, said means being attached to said beams and detachably engaged by said hooks, said beams having vertical support members of I-shape attached thereto provided with hinged upper sections, said arms being of substantially T-shape in cross section having central flange portions adapted to be received within said support members, and log stop members adjustably secured to said arms, said means for raising and lowering said arms comprising blades slidably positioned in said beams, means for moving said blocks attached thereto, and means terminally secured to said arms and said beams actuated by movement of said blocks to raise and lower said beams.

References Cited in the file of this patent

UNITED STATES PATENTS

| Number | Name | Date |
|---|---|---|
| 2,231,484 | Stoltz | Feb. 11, 1941 |
| 2,330,802 | Andersen et al. | Oct. 5, 1943 |
| 2,496,388 | Gilbey | Feb. 7, 1950 |
| 2,525,735 | Symons | Oct. 10, 1950 |
| 2,617,547 | Pridy | Nov. 11, 1952 |

FOREIGN PATENTS

| Number | Country | Date |
|---|---|---|
| 110,481 | Sweden | Apr. 25, 1944 |